US010222974B2

(12) United States Patent
Lamb et al.

(10) Patent No.: US 10,222,974 B2
(45) Date of Patent: Mar. 5, 2019

(54) METHOD AND APPARATUS FOR PROVIDING QUICK ACCESS TO DEVICE FUNCTIONALITY

(75) Inventors: Duncan Lamb, Helsinki (FI); Timo Koro, Helsinki (FI); Thomas Moltoni, London (GB); Peter Skillman, London (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 13/099,653

(22) Filed: May 3, 2011

(65) Prior Publication Data

US 2012/0284673 A1 Nov. 8, 2012

(51) Int. Cl.
*G06F 3/0488* (2013.01)

(52) U.S. Cl.
CPC ................ *G06F 3/04883* (2013.01)

(58) Field of Classification Search
CPC ......... G06F 3/0488; G06F 21/00; G06F 3/017
USPC ........................................................ 715/863
See application file for complete search history.

(56) References Cited

U.S. PATENT DOCUMENTS

| 5,404,458 A * | 4/1995 | Zetts ............................... 710/73 |
| 5,805,167 A * | 9/1998 | van Cruyningen ... G06F 3/0482 715/808 |
| 2002/0015064 A1* | 2/2002 | Robotham et al. ........... 345/863 |
| 2005/0251555 A1* | 11/2005 | Little, II ............. H04L 12/5815 709/206 |
| 2006/0218499 A1* | 9/2006 | Matthews et al. ............ 715/765 |
| 2007/0189737 A1* | 8/2007 | Chaudhri et al. ............. 386/125 |
| 2009/0006991 A1* | 1/2009 | Lindberg ............ G06F 3/04817 715/763 |
| 2009/0094562 A1* | 4/2009 | Jeong et al. .................. 715/863 |
| 2010/0001967 A1* | 1/2010 | Yoo ............................... 345/173 |
| 2010/0083190 A1* | 4/2010 | Roberts ............... G06F 3/04883 715/863 |

(Continued)

FOREIGN PATENT DOCUMENTS

| EP | 1 962 480 A2 | 8/2008 |
| EP | 2 076 000 A2 | 7/2009 |

(Continued)

OTHER PUBLICATIONS

International Search Report and Written Opinion for Application No. PCT/IB2012/052162 dated Dec. 4, 2012.

(Continued)

*Primary Examiner* — Abdullah Al Kawsar
*Assistant Examiner* — Patrick R Ramsey
(74) *Attorney, Agent, or Firm* — Alston & Bird LLP

(57) ABSTRACT

A method for providing quick access to device functionality responsive to a touch gesture may include receiving an indication of a swipe gesture being performed from a first predefined portion of a display to a second predefined portion of a touch screen display, classifying the swipe gesture as a trigger gesture based on insertion of a motion delay of at least a threshold period of time in connection with the swipe gesture, and causing, in response to classifying the trigger gesture, a display of a predefined set of functional elements that cause execution of a corresponding function when a respective one of the predefined set of functional elements is selected. A corresponding apparatus and computer program product are also provided.

26 Claims, 8 Drawing Sheets

(56) References Cited

U.S. PATENT DOCUMENTS

| | | | |
|---|---|---|---|
| 2010/0146384 A1* | 6/2010 | Peev | H04M 1/673 715/255 |
| 2010/0185989 A1* | 7/2010 | Shiplacoff et al. | 715/856 |
| 2010/0214237 A1 | 8/2010 | Echeverri et al. | |
| 2010/0257490 A1 | 10/2010 | Lyon et al. | |
| 2010/0265194 A1* | 10/2010 | Liu | G06F 3/04883 345/173 |
| 2010/0269040 A1* | 10/2010 | Lee | G06F 3/04817 715/702 |
| 2010/0306693 A1* | 12/2010 | Brinda | 715/784 |
| 2011/0029920 A1* | 2/2011 | Kang | G06F 3/0488 715/810 |
| 2011/0034208 A1* | 2/2011 | Gu | G06F 3/04883 455/550.1 |
| 2011/0041102 A1* | 2/2011 | Kim | G06F 3/04883 715/863 |
| 2011/0081889 A1* | 4/2011 | Gao | G06F 3/038 455/411 |
| 2011/0105193 A1* | 5/2011 | Lee | G06F 3/0488 455/566 |
| 2011/0163972 A1* | 7/2011 | Anzures | G06F 3/04886 345/173 |
| 2011/0196864 A1 | 8/2011 | Mason et al. | |
| 2011/0209093 A1* | 8/2011 | Hinckley et al. | 715/834 |
| 2011/0256848 A1* | 10/2011 | Bok | G06F 3/04883 455/411 |
| 2012/0009896 A1* | 1/2012 | Bandyopadhyay | G06F 1/1643 455/411 |
| 2012/0023573 A1* | 1/2012 | Shi | G06F 3/04883 726/17 |
| 2012/0036556 A1* | 2/2012 | LeBeau | G06F 3/048 726/3 |
| 2012/0133484 A1* | 5/2012 | Griffin | 340/5.54 |
| 2012/0167017 A1 | 6/2012 | Oh | |
| 2012/0185801 A1* | 7/2012 | Madonna et al. | 715/834 |
| 2012/0218200 A1 | 8/2012 | Glazer et al. | |

FOREIGN PATENT DOCUMENTS

| | | |
|---|---|---|
| EP | 2 148 497 A1 | 1/2010 |
| RU | 2 391 696 C2 | 6/2010 |
| RU | 2 410 259 C2 | 1/2011 |
| WO | WO 2007/089766 A2 | 8/2007 |
| WO | WO 2008/030976 A2 | 3/2008 |
| WO | WO 2012/098285 A1 | 7/2012 |

OTHER PUBLICATIONS

Extended European Search Report from European Patent Application No. 12779574.8 dated Nov. 26, 2014.

Office Action from corresponding European Patent Application No. 12779574.8 dated Dec. 2, 2016.

Office Action from corresponding Russian Patent Application No. 2013152337 dated Mar. 3, 2015.

Decision to Grant a Patent for an Invention from corresponding Russian Patent Application No. 2013152337 dated Nov. 17, 2015.

* cited by examiner

METHOD AND APPARATUS FOR PROVIDING QUICK ACCESS TO DEVICE FUNCTIONALITY

TECHNOLOGICAL FIELD

Some example embodiments of the present invention relate generally to user interface technology and, more particularly, relate to a method and apparatus for providing quick access to certain device functionality responsive to a touch gesture.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, web browsing, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, electronic book or reading device, etc.

In many situations, it may be desirable for the user to interface with a device such as a mobile terminal for the provision of an application or service. A user's experience during certain applications such as, for example, web browsing or navigating through content may be enhanced by using a touch screen display as the user interface. Furthermore, some users may have a preference for use of a touch screen display for entry of user interface commands over other alternatives. In recognition of the utility and popularity of touch screen displays, many devices, including some mobile terminals, now employ touch screen displays. As such, touch screen devices are now relatively well known in the art, with numerous different technologies being employed for sensing a particular point at which an object may contact the touch screen display.

BRIEF SUMMARY

A method, apparatus and computer program product are provided to enable the provision of quick access to certain device functionality responsive to a touch gesture. In some cases, for example, a touch gesture may be provided in order to trigger presentation of a set of quick launch or quick access icons or other functional elements. The quick launch icons may be accessed in this manner from any of a plurality of initial states and, at least in some examples, the nature of the quick launch icons may be determined based on the initial state when the quick launch icons are triggered.

Some embodiments of the invention may provide a method, apparatus and computer program product for improving user experience relating to devices having touch screen interfaces. As a result, for example, mobile terminal users may enjoy improved capabilities with respect to accessing information related to content and other services or applications that may be used in connection with a touch screen display.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

Figure 3A:
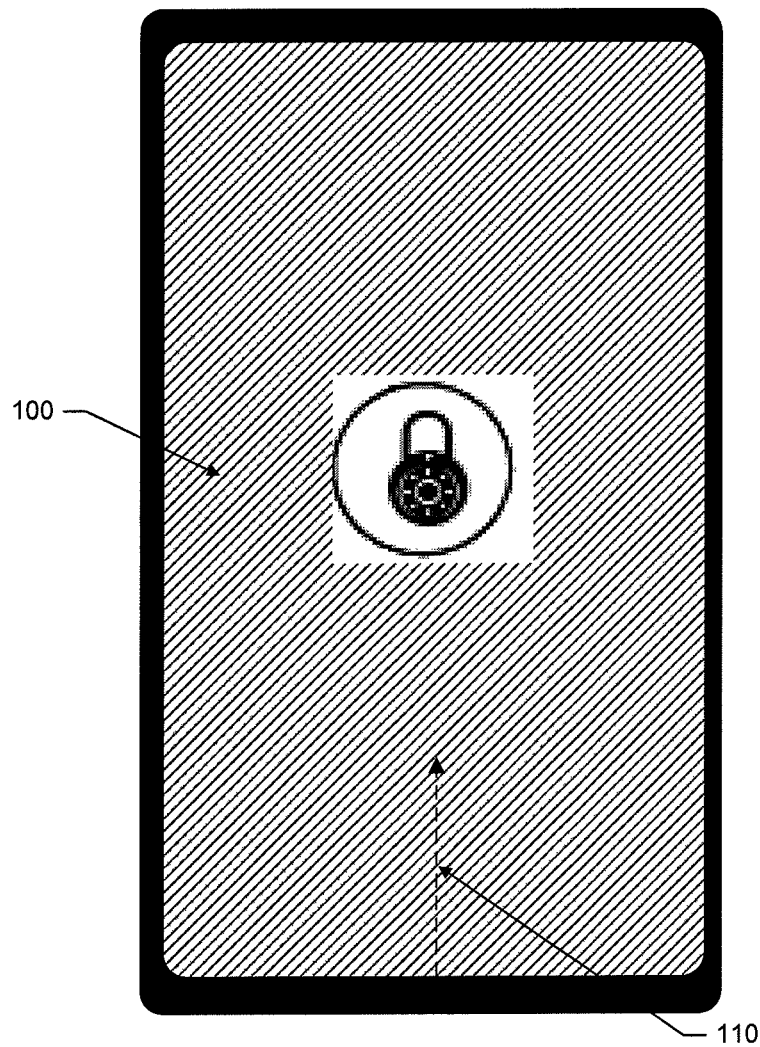
Figure 3B:
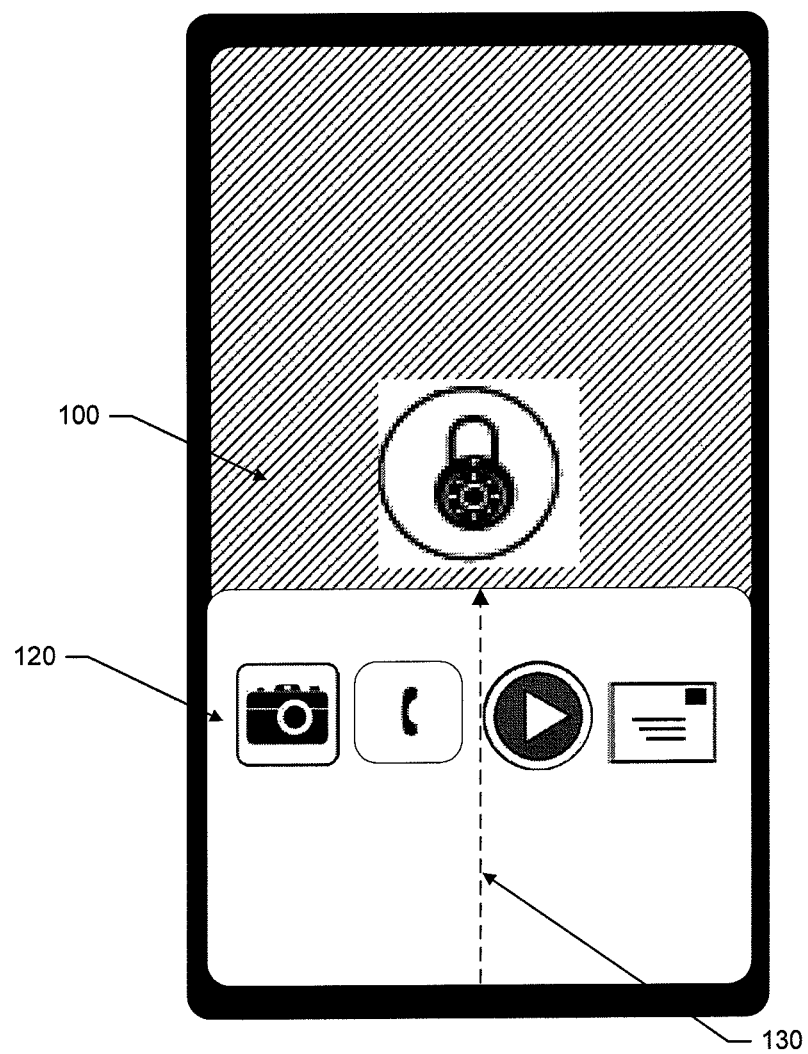
Figure 3C:
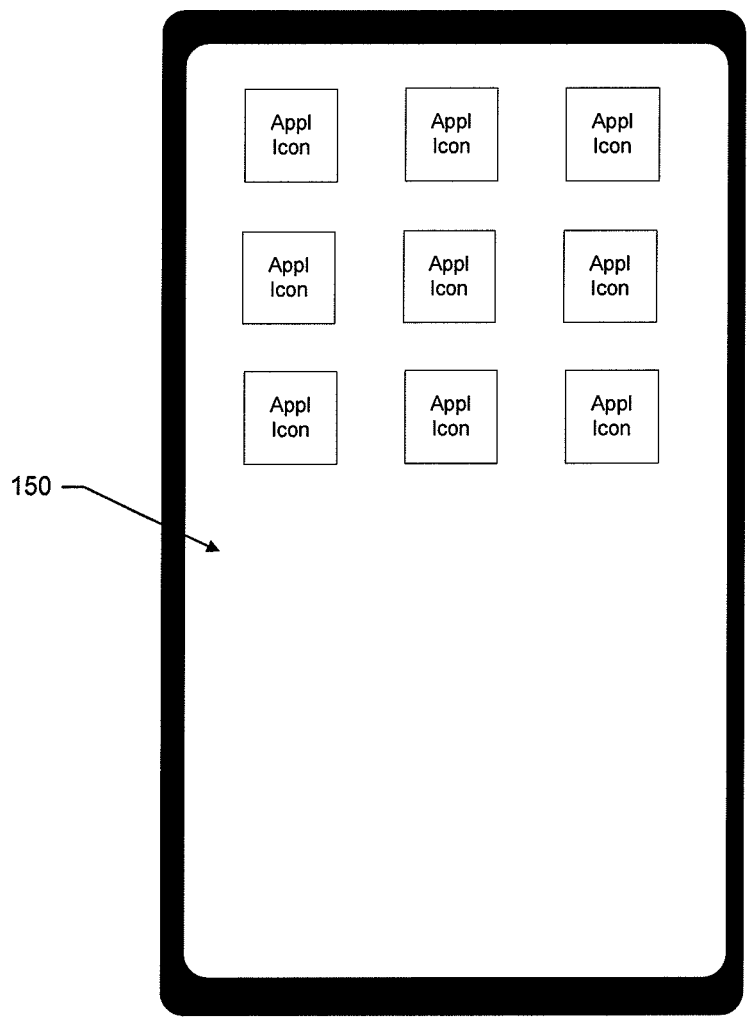
Figure 4A:
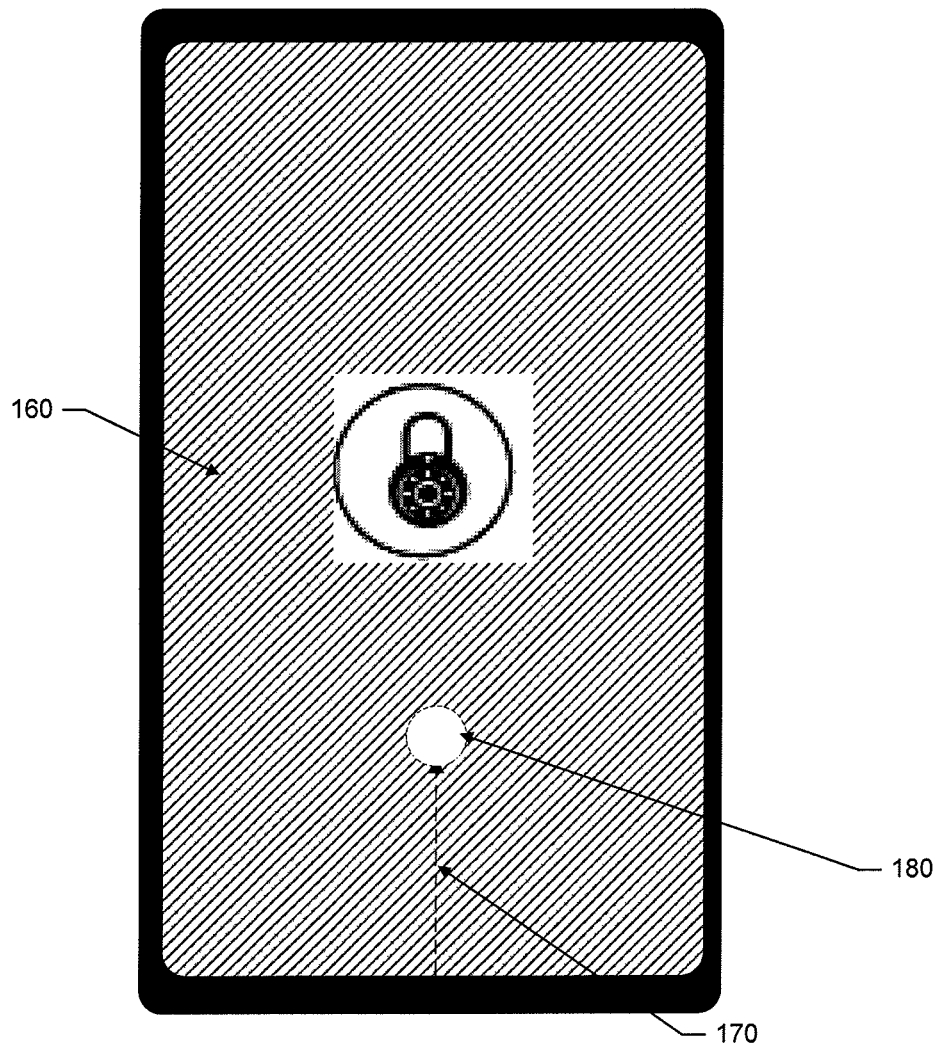
Figure 4B:
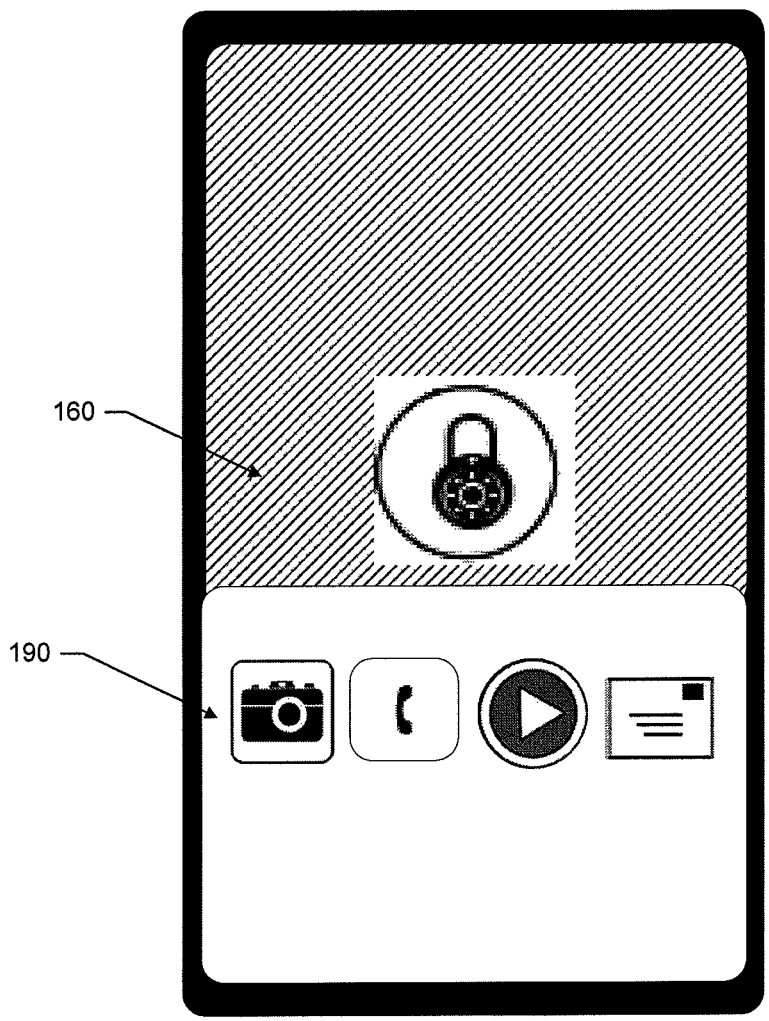
Figure 5:
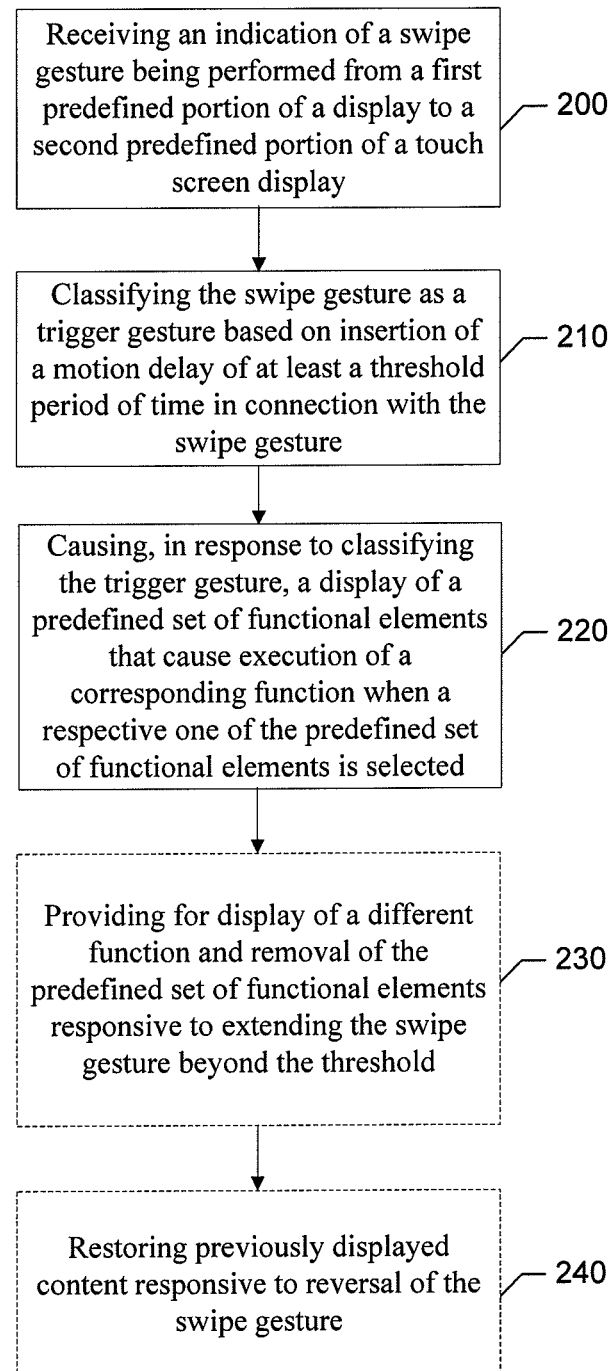

FIG. 3, which includes FIGS. 3A to 3C, illustrates an example series of screens that may be presented when operating according to an example embodiment of the present invention;

FIG. 4, which includes FIGS. 4A to 4B, illustrates an example series of screens that may be presented when operating according to an alternative example embodiment of the present invention; and FIG. 5 is a block diagram according to an example method for providing quick access to device functionality responsive to a touch gesture according to an example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

The use of a touch screen interface is often attractive to users due to the generally intuitive nature of the interface. Various activities such as selecting an object, dragging an object, drawing a symbol, turning a page, zooming in or out, and/or the like, are often performed using simple gestures that seem to naturally coincide with the resulting activity. Thus, touch screen devices have been becoming increasingly popular.

The touch screen interface typically displays content on a display screen and also accepts inputs from the user through the same touch screen. Thus, most touch screen devices provide access to various functions through one or more inputs that are entered via interaction of an object (e.g., a finger or stylus) with the touch screen display. Dependent upon the screen being presented, various options may be accessed by a single selection of a particular icon or menu item that may be currently displayed. However, given that certain screens that are being presented may be associated with a particular application or function, the functionalities that may be easily or quickly accessible (e.g., with a minimal number of interactions or selections with the touch screen) may be limited to only those that have a direct association to the particular application or function.

Some example embodiments may provide users with a relatively easy to implement and intuitive interaction mode by which quick access to functionalities that are not necessarily directly associated with a current application or display screen may be provided. In this regard, for example, some embodiments may provide for an ability to access a predefined set of functional elements (e.g., quick launch icons) that cause the launching of a corresponding application or function when respective ones of the predefined set of functional elements are selected. A gesture (e.g., a trigger gesture) may be defined to trigger the display of the quick launch icons under predefined circumstances (trigger conditions). The trigger gesture may include a swipe gesture from an edge portion of the touch screen display (e.g., the bottom edge in one example) toward a middle portion of the touch screen display. As such, the trigger gesture may, in some instances, be dependent upon the length of the swipe gestures. For example, in some cases, the trigger gesture may be defined relative to certain threshold distances or lengths of the swipe gesture. For example, a swipe gesture that exceeds (or is longer than) a certain threshold may trigger a certain function, while a swipe gesture that does not exceed (or is shorter than the threshold) may cause presentation of the quick launch icons. However, in some examples, the trigger gesture may not be directly tied to the length of the swipe gesture, but may instead be tied to a motion delay inserted in connection with the initiation of a swipe gesture of any length. For example, responsive to detection of any swipe (e.g., from an edge of the display toward a middle portion of the display), the insertion of a motion delay (e.g., of about 300 ms in one example) may complete the trigger gesture. In some cases, the functionalities that are accessible through the quick launch icons (and therefore also in some cases the graphical representation provided for respective ones of the quick launch icons) may be static and/or predefined. However, in other cases, the functionalities may be dynamically determined based on various conditions. Furthermore, in some cases, the functionalities that are accessible via the quick launch icons may depend upon the current device state (e.g., the current application or content being displayed).

Figure 1:
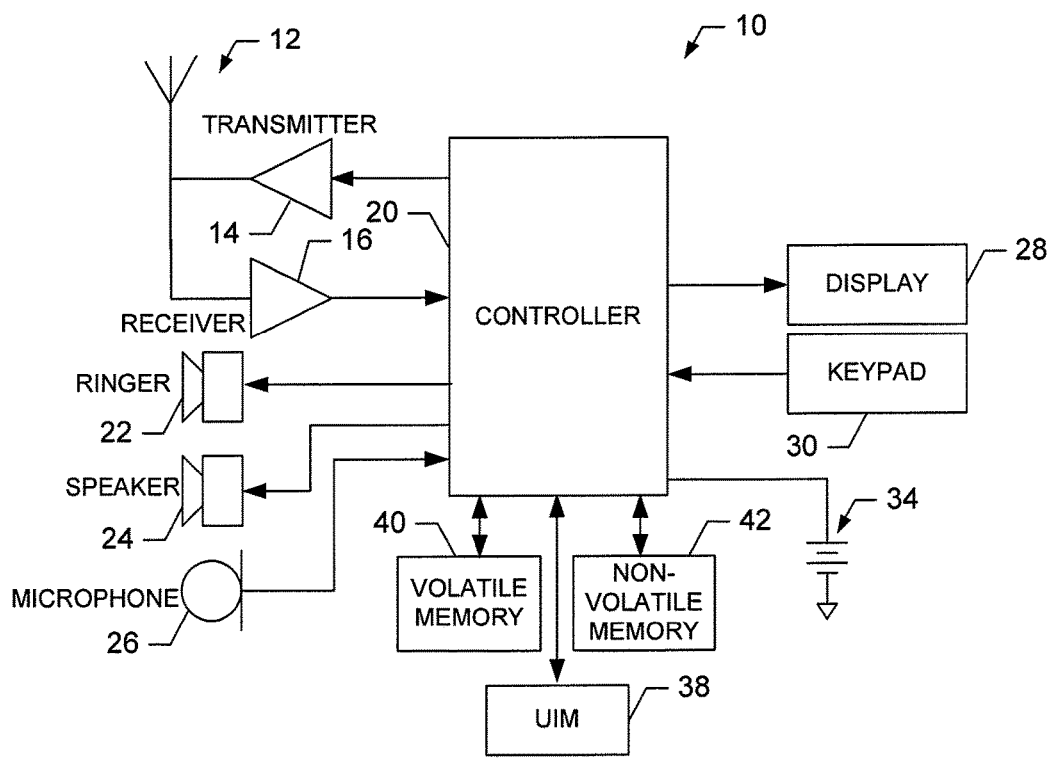
FIG. 1 is a schematic block diagram of a mobile terminal according to an example embodiment of the present invention.

FIG. 1, one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a controller 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the controller 20 may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (display 28 providing an example of such a touch display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (MCC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element (not shown) in order to capture images or video of objects, people and places proximate to the user of the mobile terminal 10. However, the mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, in which certain elements of an apparatus 50 for providing quick access to device functionality responsive to a touch gesture are displayed. The apparatus 50 of FIG. 2 may be employed, for example, in conjunction with the mobile terminal 10 of FIG. 1. However, it should be noted that the apparatus 50 of FIG. 2, may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer or other user terminal. Moreover, in some cases, the apparatus 50 may be on a fixed device such as server or other service platform and the content may be presented (e.g., via a server/client relationship) on a remote device such as a user terminal (e.g., the mobile terminal 10) based on processing that occurs at the fixed device.

Figure 2:
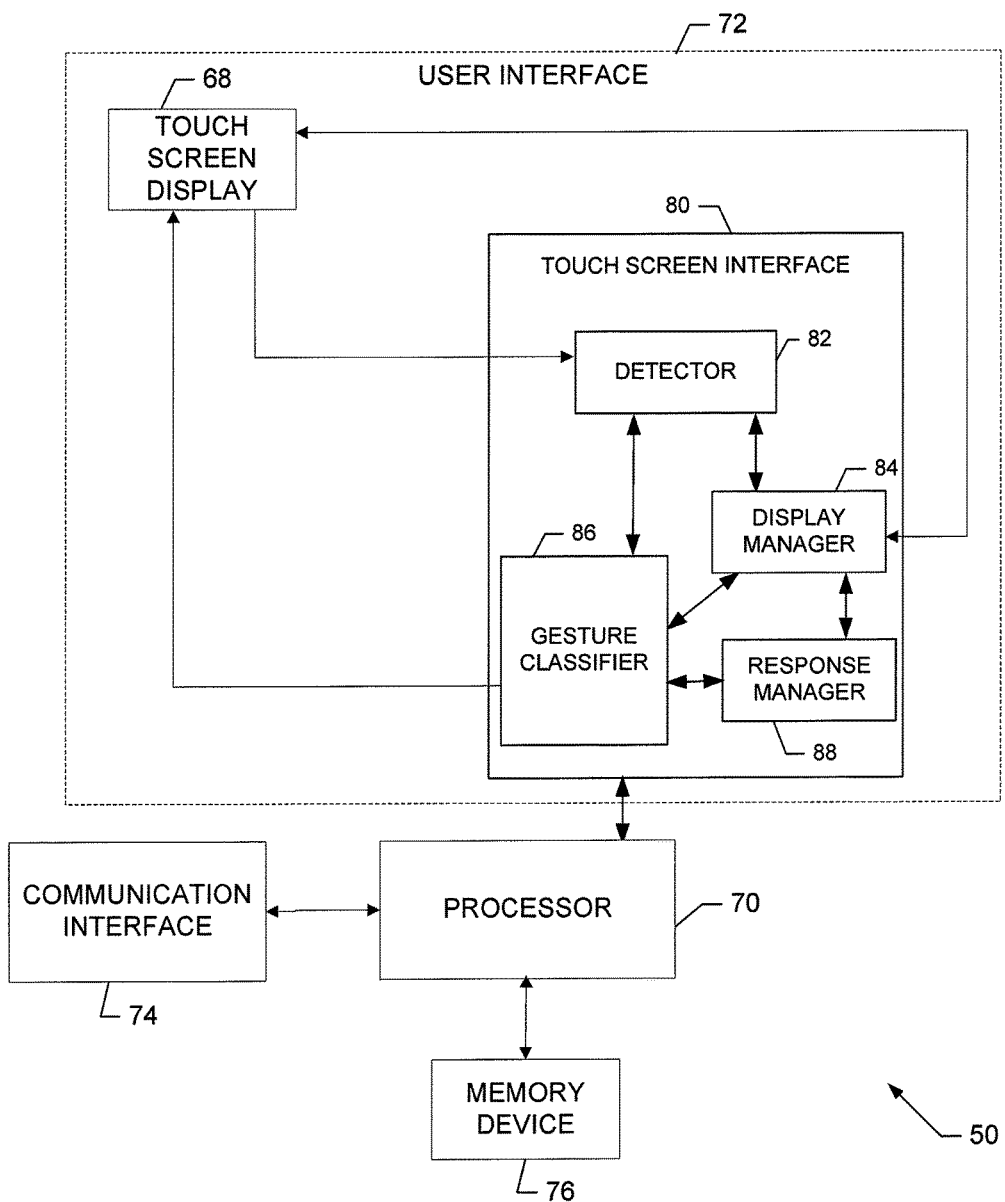
FIG. 2 is a schematic block diagram of an apparatus for providing quick access to device functionality responsive to a touch gesture according to an example embodiment of the present invention.

It should also be noted that while FIG. 2 illustrates one example of a configuration of an apparatus for providing quick access to device functionality responsive to a touch gesture, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 2, the apparatus 50 for providing quick access to device functionality responsive to a touch gesture is provided and may include or otherwise be in communication with a processor 70, a user interface 72, a communication interface 74 and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to cause provision of an audible, visual, mechanical or other output to the user. As such, the user interface 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the apparatus 50 may include or otherwise be in communication with a touch screen display 68 (e.g., the display 28). In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, and/or other techniques. The user interface 72 may be in communication with the touch screen display 68 to receive indications of user inputs at the touch screen display 68 and to modify a response to such indications based on corresponding user actions that may be inferred or otherwise determined responsive to the indications.

In an example embodiment, the apparatus 50 may include a touch screen interface 80. The touch screen interface 80 may, in some instances, be a portion of the user interface 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an indication of an input in the form of a touch event at the touch screen display 68. As such, the touch screen interface 80 may be in communication with the touch screen display 68 to receive indications of user inputs at the touch screen display 68 and to modify a response to such indications based on corresponding user actions that may be inferred or otherwise determined responsive to the indications. Following recognition of a touch event, the touch screen interface 80 may be configured to determine a classification of the touch event and provide a corresponding function based on the touch event in some situations.

In some embodiments, the touch screen interface 80 may include a detector 82, a display manager 84, a gesture classifier 86 and a response manager 88. Each of the detector 82, the display manager 84, the gesture classifier 86 and the response manager 88 may be any device or means embodied in either hardware or a combination of hardware and software configured to perform the corresponding functions associated with the detector 82, the display manager 84, the gesture classifier 86 and the response manager 88, respectively, as described herein. In an exemplary embodiment, each of the detector 82, the display manager 84, the gesture classifier 86 and the response manager 88 may be controlled by or otherwise embodied as the processor 70.

The detector 82 may be in communication with the touch screen display 68 to receive indications of user inputs in order to recognize and/or determine a touch event based on each input received at the detector 82. A touch event may be defined as a detection of an object, such as a stylus, finger, pen, pencil, glove or any other pointing device, coming into contact with a portion of the touch screen display in a manner sufficient to register as a touch. In this regard, for example, a touch event could be a detection of pressure on the screen of the touch screen display 68 above a particular pressure threshold over a given area or the detection of a change in the electrostatic field of the touch screen display 68 at a particular location. As such, some touch events may not actually require physical contact with the touch screen display 68. For example, in some cases, the touch screen display 68 may be configured to detect one or more objects (e.g., a finger or fingers) hovering over the touch screen display 68. Gestures associated with the object or objects may also be detected in some cases, even without physical contact with the touch screen display 68. For example, in some cases, a touch event may be sensed through an article of clothing, fabric, flexible material, thin material, and/or the like. Subsequent to each touch event, the detector 82 may be further configured to pass along the data corresponding to the touch event (e.g., location of touch, length of touch, number of objects touching, touch pressure, speed of movement, direction of movement, length of delay, frequency of touch, etc.) to the gesture classifier 86 for gesture classification.

The gesture classifier 86 may be configured to recognize and/or determine a corresponding classification of a touch event. In other words, the gesture classifier 86 may be configured to perform gesture classification to classify the touch event as any of a number of possible gestures. Some examples of recognizable gestures may include a touch, multi-touch, stroke, character, symbol, shape, swipe, pinch event (e.g., a pinch in or pinch out) and/or the like.

A touch may be defined as a touch event that impacts a single area (without or with minimal movement on the surface of the touch screen display 68) and then is removed. A multi-touch may be defined as multiple touch events sensed at the same time (or nearly the same time). A stroke event (or swipe) may be defined as a touch event followed immediately by motion of the object initiating the touch event while the object remains in contact with the touch screen display 68. In other words, the stroke event may be defined by motion following a touch event thereby forming a continuous, moving touch event defining a moving series of instantaneous touch positions (e.g., as a drag operation, swipe or as a flick operation). Multiple strokes and/or touches may be used to define a particular shape or sequence of shapes to define a character.

In an example embodiment, the gesture classifier 86 may be configured to classify a predefined gesture as a trigger gesture to trigger the presentation of a predefined set of icons or functional elements (e.g., quick launch icons). The quick launch icons may, responsive to selection of one of the icons, cause the launching of a corresponding application or function when respective ones of the predefined set of functional elements are selected. The trigger gesture may be defined as a swipe gesture from an edge portion of the touch screen display (e.g., the bottom edge in one example) toward a middle portion of the touch screen display. In some cases, the trigger gesture may be defined relative to certain threshold distances or lengths of the swipe gesture. For example, the gesture classifier 86 may be configured to classify a swipe gesture that exceeds (or is longer than) a certain threshold as a function implementation gesture that may trigger a certain function. Meanwhile, a swipe gesture that does not exceed (or is shorter than the threshold) may be classified by the gesture classifier 86 as a trigger gesture. As indicated above, in some example embodiments, the trigger gesture may not be related to the length of the swipe gesture, but may instead be determined based on insertion of a motion delay in connection with the initiation of a swipe gesture of any length. For example, responsive to detection of any swipe (e.g., from an edge of the display toward a middle portion of the display), the insertion of a motion delay (e.g., of about 300 ms in one example) may complete the trigger gesture. Thus, the gesture classifier 86 may be configured to detect a trigger gesture based on the insertion of a motion delay of at least a threshold amount in connection with the provision of a swipe gesture.

The response manager 88 may be configured to interact with the display manager 84 to cause a corresponding response to be generated on the touch screen display 68. For example, in response to detection of the functional implementation gesture, the display manager 84 may cause presentation of content, triggering of a state change (e.g., device unlock, application launch, etc.) and/or the like. In response to detection of the trigger gesture by the gesture classifier 86, the response manager 88 may be configured to cause presentation of the quick launch icons via the display manager 84.

The response manager 88 may also be configured to enable the definition of static or dynamic criteria for controlling various aspects of the displayed content, functions, state, changes or other responses to be generated by the display manager 84. Thus, for example, in some cases, the functionalities that are accessible through the quick launch icons may be static and/or predefined. For example, for certain initial states, initial applications, or initially displayed content, a corresponding set of functionalities may be quickly accessed via the quick launch icons that are prescribed for each respective initial state, initial application or initially displayed content item. Moreover, the graphical representation of the icons themselves may be altered based on the initial conditions at the time a trigger gesture is detected. Thus, for example, if the initial state of the display screen is that a locked screen is presented, a fixed set of quick launch icons may be presented. Meanwhile, if a home screen is initially presented, another set of quick launch icons (perhaps with some or all of the icons being different) may be provided. Each of the sets may be a fixed set that is predefined for the corresponding situation either by the manufacturer or by the user.

In some other embodiments, the functionalities to which access is provided by the quick launch icons (and the corresponding graphical representations) may be dynamically determined based on various conditions. For example, the functionalities to which access is provided (and the corresponding icons presented) may be generated based on the current content, the current state, or current application on a dynamic basis. In this regard, for example, dynamic criteria such as a most used related or unrelated application or function may be utilized to determine which sets of functionalities are to be provided as quick launch icons. Alternatively or additionally, dynamic criteria such as the currently running applications may impact the selection of quick launch icons.

FIG. 3, which includes FIGS. 3A to 3C, illustrates an example of operation of one embodiment in which swipe length is used in trigger gesture determination. In this regard, FIG. 3A illustrates a locked screen 100 and swipe path 110 illustrates the path of a user swipe over the locked screen 100. Since the swipe path 110 proceeds from an edge of the display toward a center portion of the display, the gesture classifier 86 may classify the movement as a trigger gesture and display quick launch icons 120, as shown in FIG. 3B. In FIG. 3B, the quick launch icons 120 are shown as an overlay over the underlying content displayed below the quick launch icons 120 (namely the locked screen 100 in this example). However, the quick launch icons 120 could alternatively displace a corresponding portion of the underlying content (e.g., causing such content to shift up), cause the underlying content to fade away while the quick launch icons 120 fade in, or the like.

If the user releases the swipe gesture while the quick launch icons 120 are being displayed, the quick launch icons 120 may be presented for user selection of one of the icons to launch a corresponding function. However, if the user continues to trace or extend the swipe path as shown by the extended swipe path 130 of FIG. 3B, the extended swipe path 130 may be recognized as the functional implementation gesture and a corresponding state change (e.g., device unlock), or function (e.g., an application launch, content selection, or function implementation) may be executed. FIG. 3C illustrates an example where the device is unlocked by the functional implementation gesture. After being unlocked, the display shows a home screen 150 with a plurality of application icons displayed thereon. However, it should appreciate that the home screen 150 could be replaced with other content or another function or application in other examples.

In some example embodiments, responsive to the user extending the swipe gesture over the swipe path 110 and then re-tracing the swipe path 110 in the opposite direction (e.g., back to the edge of the display), the state or content that was displayed prior to presentation of the quick launch icons 120 may be re-presented. In the present example, this type of reverse swipe may trigger a return to the display of the locked screen 100 of FIG. 3A. In some embodiments, once the quick launch icons 120 are displayed responsive to the user performing the trigger gesture and ending contact with the screen, the quick launch icons 120 may be removed responsive to selection of one of the icons (and subsequent launching of a corresponding function). Alternatively or additionally, the quick launch icons 120 may be removed responsive to a release or removal input (e.g., a double tap or other predefined input.

FIG. 4, which includes FIGS. 4A to 4B, illustrates an example of operation of one embodiment in which insertion of a motion delay in connection with a swipe gesture is used in trigger gesture determination. In this regard, FIG. 4A illustrates a locked screen 160 and swipe path 170 illustrates the path of a user swipe over the locked screen 160. At some point along the swipe path 170, the user may institute a motion delay by holding the swipe for a period of time as indicated by delay circle 180. If the swipe is held for greater than a predetermined or threshold period of time, the motion delay in connection with the swipe may be detected as the trigger gesture and the quick launch icons 190 may be displayed as shown in FIG. 4B.

It should be appreciated that although FIGS. 3 and 4 each show an initial screen being a locked screen, example embodiments are also practiced from other initial screens including fully functional screens such as a home screen, a screen associated with a particular application, a screen displaying content of any kind, and/or the like.

Accordingly, in an example embodiment, the gesture classifier 86 may be configured to communicate detection information regarding the recognition, detection and/or classification of a touch event to the display manager 84 and the response manager 88. The response manager 88 may then prescribe a set of quick launch icons to be displayed dependent upon the conditions present and the corresponding criteria (static or dynamic) that determine which quick launch icons to present for the present conditions. The display manager 84 may be configured to provide control over modifications made to that which is displayed on the touch screen display 68 based on the detection information received from the detector 82 and gesture classifications provided by the gesture classifier 86 in accordance with the responses prescribed for each respective gesture classification and implementation characteristic determined by the gesture classifier 86 as prescribed by the response manager 88. In other words, the display manager 84 may configure the display (e.g., with respect to the content displayed and/or the user interface effects presented relative to the content displayed) quick launch icons that are tailored to the content, applications or functions prescribed for given conditions.

In an example embodiment, the display manager 84 may be configured to interface with the response manager 88 in response to a determination (e.g., by the gesture classifier 86) that a trigger gesture has occurred, to display a selected set of functional elements. Once the trigger gesture is terminated by reverse swipe the prior content may be restored. If the trigger gesture is terminated by extending the swipe gesture beyond a threshold, the display manager 84 may cause execution of another function or display of other content or applications. However, if the trigger gesture is terminated (e.g., by lifting the finger) prior to reaching the threshold, the set of functional elements may be presented for user selection. In some cases, the user may define the threshold length. Moreover, the user may also prescribe various other display effects, such as increasing or decreasing size, opacity, color intensity or other characteristics of the quick launch icons based on predefined criteria.

FIG. 5 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (either mobile or fixed) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 5, may include receiving an indication of a swipe gesture being performed from a first predefined portion of a display to a second predefined portion of a touch screen display at operation 200, classifying the swipe gesture as a trigger gesture based on insertion of a motion delay of at least a threshold period of time in connection with the swipe gesture at operation 210, and causing, in response to classifying the trigger gesture, a display of a predefined set of functional elements that cause execution of a corresponding function when a respective one of the predefined set of functional elements is selected at operation 220.

In some embodiments, certain ones of the operations above may be modified or further amplified as described below. Moreover, in some embodiments additional optional operations may also be included (some examples of which are shown in dashed lines in FIG. 5). It should be appreciated that each of the modifications, optional additions or amplifications below may be included with the operations above either alone or in combination with any others among the features described herein. In some embodiments, the method may further include providing for display of a different function and removal of the predefined set of functional elements responsive to extending the swipe gesture beyond a threshold length or responsive to release of the gesture prior to the threshold period at operation 230 and/or restoring previously displayed content responsive to reversal of the swipe gesture at operation 240. In some embodiments, receiving the indication of the swipe gesture may include receiving an indication of a swipe performed from a bottom edge of the touch screen display toward a middle portion of the touch screen display. In an example embodiment, the threshold length is predefined or established by a user. In some cases, causing display of the predefined set of functional elements may include causing the predefined set of functional elements to be displayed over content previously displayed over which the swipe gesture is provided, causing the predefined functional elements to be displayed such that content previously displayed is displaced by the predefined set of functional elements, or causing the predefined set of functional elements to fade in while the content previously displayed fades out. In some embodiments, the predefined set of functional elements may include icons selected based on static relationships defining functional elements to be displayed based on a current device state, current application or currently displayed content. In an example embodiment, the predefined set of functional elements may include icons selected based on dynamic criteria associated with a current device state, current application or currently displayed content.

In an example embodiment, an apparatus for performing the method of FIG. 5 above may comprise a processor (e.g., the processor 70) configured to perform some or each of the operations (200-240) described above. The processor 70 may, for example, be configured to perform the operations (200-240) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-240 may comprise, for example, the touch screen interface 80 (or respective different components thereof). Additionally or alternatively, at least by virtue of the fact that the processor 70 may be configured to control or even be embodied as the touch screen interface 80, the processor 70 and/or a device or circuitry for executing instructions or executing an algorithm for processing information as described above may also form example means for performing operations 200-240.

An example of an apparatus according to an example embodiment may include at least one processor and at least one memory including computer program code. The at least one memory and the computer program code may be configured to, with the at least one processor, cause the apparatus to perform the operations 200-240 (with or without the modifications and amplifications described above in any combination).

An example of a computer program product according to an example embodiment may include at least one computer-readable storage medium having computer-executable program code portions stored therein. The computer-executable program code portions may include program code instructions for performing operation 200-240 (with or without the modifications and amplifications described above in any combination).

In some cases, the operations (200-240) described above, along with any of the modifications may be implemented in a method that involves facilitating access to at least one interface to allow access to at least one service via at least one network. In such cases, the at least one service may be said to perform at least operations 200-240.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving an indication of a swipe gesture being performed in a direction extending from an edge portion of a touch screen display of a device toward a middle portion of the touch screen display of the device, wherein the swipe gesture is initiated on the touch screen display of the device; and
classifying the swipe gesture as one or more of a functional implementation gesture and a trigger gesture and causing one or more responses to the classified swipe gesture, wherein the device is configured to perform the classifying the swipe gesture and the causing one or more responses by:
in an instance in which a motion delay during which the swipe gesture is held stationary at one contact position on the touch screen extends for at least a predetermined period of time, classifying the swipe gesture as the trigger gesture, and, in response to classifying the swipe gesture as the trigger gesture:
in an instance in which the device is in a locked state and displaying a locked screen when the swipe gesture is initiated, causing a display of a first set of functional elements that cause a launch and execution of different corresponding applications when respective ones of the first set of functional elements are selected, and
in an instance in which the device is displaying a home screen including a plurality of functional icons when the swipe gesture is initiated, causing a display of a second set of functional elements, different than the first set of functional elements, that cause a launch and execution of different corresponding applications when respective ones of the second set of functional elements are selected;
while maintaining the display of the first or second set of functional elements in response to the motion delay, detecting termination of the trigger gesture by: (i) a removal of contact from the touch screen at the contact position while a length of the swipe gesture remains less than a predetermined distance or (ii) a continuation of the swipe gesture from the contact position with a length of the swipe gesture exceeding the predetermined distance prior to removal of the contact form the touch screen;
in response to detecting termination of the trigger gesture by the removal of the contact from the touch screen at the contact position, maintaining the display of the first or second set of functional elements; and
in response to detecting termination of the trigger gesture by the continuation of the swipe gesture, classifying the swipe gesture with the length exceeding the predetermined distance as the functional implementation gesture, and:
in an instance in which the device is in the locked state, causing the device to undergo a state change and to be unlocked, removing from the display the first set of functional elements that had been previously displayed in response to the trigger gesture, and causing the home screen to be displayed, and
in an instance in which the device is displaying the home screen, causing the device to remove from the display the second set of functional elements that had been previously displayed in response to the trigger gesture, and maintaining the display of the home screen.

2. The method of claim 1, wherein receiving the indication of the swipe gesture comprises receiving an indication of a swipe performed from a bottom edge of the display toward a middle portion of the display.

3. The method of claim 1, wherein the predetermined period of time is predefined or established by a user.

4. The method of claim 1, wherein causing display of the first set of functional elements comprises:
causing the first set of functional elements to be displayed over content previously displayed over which the swipe gesture is provided; or
causing the first set of functional elements to be displayed such that content previously displayed is displaced by the first set of functional elements.

5. The method of claim 1, wherein the first set of functional elements to be displayed is dependent upon a device state, application or content displayed at a time that the trigger gesture is detected.

6. The method of claim 1, wherein the first set of functional elements to be displayed is dependent upon a most used application or function.

7. The method of claim 1, further comprising restoring previously displayed content responsive to reversal of the swipe gesture.

8. The method of claim 1, further comprising causing a display of an indication of the motion delay during performance of the swipe gesture.

9. The method of claim 1, wherein causing the display of the first or second set of functional elements comprises dynamically determining the functions to which access is provided by the first or second set of functional elements that is caused to be displayed in response to classifying the trigger gesture based upon content being displayed upon receipt of the swipe gesture, and wherein dynamically determining the functions to which access is provided by the first or second set of functional elements that is caused to be displayed in response to classifying the trigger gesture is also based upon whether the home screen or the locked screen is displayed upon receipt of the swipe gesture.

10. The method of claim 1, wherein causing the display of the first set of functional elements comprises dynamically determining the functions to which access is provided by the first set of functional elements that is caused to be displayed in response to classifying the trigger gesture based upon content being displayed upon receipt of the swipe gesture, and wherein dynamically determining the functions to which access is provided by the first set of functional elements that is caused to be displayed in response to classifying the trigger gesture is also based upon which applications or functions are most used.

11. The method of claim 1, wherein causing the display of the first set of functional elements comprises dynamically determining the functions to which access is provided by the first set of functional elements that is caused to be displayed in response to classifying the trigger gesture based upon content being displayed upon receipt of the swipe gesture, and wherein dynamically determining the functions to which access is provided by the first set of functional elements that is caused to be displayed in response to classifying the trigger gesture is also based upon a device state or current application upon receipt of the swipe gesture.

12. The method of claim 1, wherein causing display of the first or second set of functional elements comprises causing the first or second set of functional elements to fade in while content previously displayed fades out.

13. An apparatus comprising at least one processor and at least one memory including computer program code, the at least one memory and the computer program code configured to, with the processor, cause the apparatus to perform steps including at least:
receiving an indication of a swipe gesture being performed in a direction extending from an edge portion of a touch screen display of a device toward a middle portion of the touch screen display of the device, wherein the swipe gesture is initiated on the touch screen display of the device; and
classifying the swipe gesture as one or more of a functional implementation gesture and a trigger gesture and causing one or more responses to the classified swipe gesture, wherein the device is configured to perform the classifying the swipe gesture and the causing one or more responses by:
in an instance in which a motion delay during which the swipe gesture is held stationary at one contact position on the touch screen extends for at least a predetermined period of time, classifying the swipe gesture as the trigger gesture, and, in response to classifying the swipe gesture as the trigger gesture:
in an instance in which the device is in a locked state and displaying a locked screen when the swipe gesture is initiated, causing a display of a first set of functional elements that cause a launch and execution of different corresponding applications when respective ones of the first set of functional elements are selected, and
in an instance in which the device is displaying a home screen including a plurality of functional icons when the swipe gesture is initiated, causing a display of a second set of functional elements, different than the first set of functional elements, that cause a launch and execution of different corresponding applications when respective ones of the second set of functional elements are selected;
while maintaining the display of the first or second set of functional elements in response to the motion delay, detecting termination of the trigger gesture by: (i) a removal of contact from the touch screen at the contact position while a length of the swipe gesture remains less than a predetermined distance or (ii) a continuation of the swipe gesture from the contact position with a length of the swipe gesture exceeding the predetermined distance prior to removal of the contact form the touch screen;
in response to detecting termination of the trigger gesture by the removal of the contact from the touch screen at the contact position, maintaining the display of the first or second set of functional elements; and
in response to detecting termination of the trigger gesture by the continuation of the swipe gesture, classifying the swipe gesture with the length exceeding the predetermined distance as the functional implementation gesture, and:
in an instance in which the device is in the locked state, causing the device to undergo a state change and to be unlocked, removing from the display the first set of functional elements that had been previously displayed in response to the trigger gesture, and causing the home screen to be displayed, and
in an instance in which the device is displaying the home screen, causing the device to remove from the display the second set of functional elements that had been previously displayed in response to the trigger gesture, and maintaining the display of the home screen.

14. The apparatus of claim 13, wherein the at least one memory and computer program code are configured to, with the at least one processor, cause the apparatus to receive the indication of the swipe gesture by receiving an indication of a swipe performed from a bottom edge of the display toward a middle portion of the display.

15. The apparatus of claim 13, wherein the predetermined period of time is predefined or established by a user.

16. The apparatus of claim 13, wherein the at least one memory and computer program code are configured to, with the at least one processor, cause the apparatus to cause display of the first set of functional elements by:
causing the first set of functional elements to be displayed over content previously displayed over which the swipe gesture is provided; or
causing the first set of functional elements to be displayed such that content previously displayed is displaced by the first set of functional elements.

17. The apparatus of claim 13, wherein the first set of functional elements to be displayed is dependent upon a device state, application or content displayed at a time that the trigger gesture is detected.

18. The apparatus of claim 13, wherein the first set of functional elements to be displayed is dependent upon a most used application or function.

19. The apparatus of claim 13, wherein the at least one memory and computer program code are further configured to, with the at least one processor, cause the apparatus to restore previously displayed content responsive to reversal of the swipe gesture.

20. The apparatus of claim 13, wherein the at least one memory and computer program code are further configured to, with the at least one processor, cause the apparatus to cause a display of an indication of the motion delay during performance of the swipe gesture.

21. The apparatus of claim 13, wherein the at least one memory and computer program code are configured to, with the at least one processor, cause the apparatus to cause display of the first or second set of functional elements by causing the first or second set of functional elements to fade in while content previously displayed fades out.

22. A computer program product comprising at least one non-transitory computer-readable storage medium having computer-executable program code instructions stored therein, the computer-executable program code instructions comprising program code instructions that cause a device to perform steps including:

receiving an indication of a swipe gesture being performed in a direction extending from an edge portion of a touch screen display of a device toward a middle portion of the touch screen display of the device, wherein the swipe gesture is initiated on the touch screen display of the device; and classifying the swipe gesture as one or more of a functional implementation gesture and a trigger gesture and causing one or more responses to the classified swipe gesture, wherein the device is configured to perform the classifying the swipe gesture and the causing one or more responses by:

in an instance in which a motion delay during which the swipe gesture is held stationary at one contact position on the touch screen extends for at least a predetermined period of time, classifying the swipe gesture as the trigger gesture, and, in response to classifying the swipe gesture as the trigger gesture:

in an instance in which the device is in a locked state and displaying a locked screen when the swipe gesture is initiated, causing a display of a first set of functional elements that cause a launch and execution of different corresponding applications when respective ones of the first set of functional elements are selected, and in an instance in which the device is displaying a home screen including a plurality of functional icons when the swipe gesture is initiated, causing a display of a second set of functional elements, different than the first set of functional elements, that cause a launch and execution of different corresponding applications when respective ones of the second set of functional elements are selected;

while maintaining the display of the first or second set of functional elements in response to the motion delay, detecting termination of the trigger gesture by: (i) a removal of contact from the touch screen at the contact position while a length of the swipe gesture remains less than a predetermined distance or (ii) a continuation of the swipe gesture from the contact position with a length of the swipe gesture exceeding the predetermined distance prior to removal of the contact form the touch screen;

in response to detecting termination of the trigger gesture by the removal of the contact from the touch screen at the contact position, maintaining the display of the first or second set of functional elements; and in response to detecting termination of the trigger gesture by the continuation of the swipe gesture, classifying the swipe gesture with the length exceeding the predetermined distance as the functional implementation gesture, and:

in an instance in which the device is in the locked state, causing the device to undergo a state change and to be unlocked, removing from the display the first set of functional elements that had been previously displayed in response to the trigger gesture, and causing the home screen to be displayed, and in an instance in which the device is displaying the home screen, causing the device to remove from the display the second set of functional elements that had been previously displayed in response to the trigger gesture, and maintaining the display of the home screen.

23. The computer program product of claim 22, wherein program code instructions for receiving the indication of the swipe gesture include instructions for receiving an indication of a swipe performed from a bottom edge of the display toward a middle portion of the display.

24. The computer program product of claim 22, wherein program code instructions for causing display of the first set of functional elements include instructions for:

causing the first set of functional elements to be displayed over content previously displayed over which the swipe gesture is provided; or causing the first set of functional elements to be displayed such that content previously displayed is displaced by the first set of functional elements.

25. The computer program product of claim 22, wherein the first set of functional elements to be displayed is dependent upon (i) a device state, application or content displayed at a time that the trigger gesture is detected or (ii) a most used application or function.

26. The computer program product of claim 22, wherein program code instructions for causing display of the first or second set of functional elements include instructions for causing the first or second set of functional elements to fade in while content previously displayed fades out.

\* \* \* \* \*